US009073256B2

(12) United States Patent
De Mattia

(10) Patent No.: US 9,073,256 B2
(45) Date of Patent: Jul. 7, 2015

(54) METHOD OF MANUFACTURING A PART MADE OF COMPOSITE MATERIAL AND TOOL FOR THE IMPLEMENTATION THEREOF

(71) Applicant: Airbus Operations SAS, Toulouse (FR)

(72) Inventor: Denis De Mattia, Basse Goulaine (FR)

(73) Assignee: Airbus Operations SAS, Toulouse (FR)

( * ) Notice: Subject to any disclaimer, the term of this patent is extended or adjusted under 35 U.S.C. 154(b) by 273 days.

(21) Appl. No.: 13/792,477

(22) Filed: Mar. 11, 2013

(65) Prior Publication Data

US 2013/0234352 A1 Sep. 12, 2013

(30) Foreign Application Priority Data

Mar. 12, 2012 (FR) ...................................... 12 52175

(51) Int. Cl.
| | |
|---|---|
| B29C 43/10 | (2006.01) |
| B29C 33/30 | (2006.01) |
| B29C 51/10 | (2006.01) |
| B29C 70/34 | (2006.01) |
| B29C 70/44 | (2006.01) |

(52) U.S. Cl.
CPC ............... *B29C 51/10* (2013.01); *B29C 70/342* (2013.01); *B29C 70/44* (2013.01)

(58) Field of Classification Search
CPC ...... B29C 51/10; B29C 70/342; B29C 70/44; B29C 2043/3655; B29C 2043/3652; B20B 5/02
See application file for complete search history.

(56) References Cited

U.S. PATENT DOCUMENTS

| | | | | |
|---|---|---|---|---|
| 4,062,917 A | * | 12/1977 | Hill et al. | 264/102 |
| 4,065,340 A | * | 12/1977 | Dickerson | 156/154 |
| 4,177,306 A | * | 12/1979 | Schulz et al. | 428/107 |
| 4,492,607 A | * | 1/1985 | Halcomb | 156/242 |
| 4,734,155 A | * | 3/1988 | Tsunoda et al. | 156/583.1 |
| 4,842,670 A | * | 6/1989 | Callis et al. | 156/382 |
| 4,869,770 A | * | 9/1989 | Christensen et al. | 156/286 |
| 5,145,621 A | * | 9/1992 | Pratt | 264/102 |
| 5,348,602 A | * | 9/1994 | Makarenko et al. | 156/161 |
| 5,593,633 A | * | 1/1997 | Dull et al. | 264/510 |

(Continued)

FOREIGN PATENT DOCUMENTS

| | | |
|---|---|---|
| EP | 1243401 | 9/2002 |
| FR | 2928295 | 9/2009 |

(Continued)

OTHER PUBLICATIONS

French Search Report, Nov. 29, 2012.

*Primary Examiner* — Matthew Daniels
(74) *Attorney, Agent, or Firm* — Greer, Burns & Crain Ltd.

(57) ABSTRACT

A method and apparatus for manufacturing a composite material part from a preform of fibers pre-impregnated with resin. The method includes laying the preform on a laying surface of a tool with a peripheral shoulder, covering the preform with a conforming plate delimited by a peripheral edge which extends beyond the peripheral flank of the preform over the entire periphery of the preform, using shims calibrated to position the conforming plate, the shims being arranged between the support surface of the peripheral shoulder and the peripheral edge of the conforming plate, removing the calibrated shims, arranging a seal connecting the conforming plate and the tool all around the preform, and polymerizing the preform.

3 Claims, 2 Drawing Sheets

(56) References Cited

U.S. PATENT DOCUMENTS

| | | | |
|---|---|---|---|
| 5,597,435 A * | 1/1997 | Desautels et al. | 156/245 |
| 5,665,461 A * | 9/1997 | Wong et al. | 523/218 |
| 5,716,488 A * | 2/1998 | Bryant | 156/382 |
| 5,759,325 A * | 6/1998 | Davis | 156/154 |
| 6,527,894 B1 * | 3/2003 | Rocker et al. | 156/182 |
| 2002/0135093 A1 | 9/2002 | Davis | |
| 2002/0144401 A1 * | 10/2002 | Nogueroles Vines et al. | 29/897.2 |
| 2003/0168555 A1 * | 9/2003 | Livi et al. | 244/132 |
| 2004/0219251 A1 * | 11/2004 | Eberth et al. | 425/520 |
| 2004/0265406 A1 * | 12/2004 | Lorenz et al. | 425/110 |
| 2006/0130993 A1 * | 6/2006 | Blanton et al. | 164/97 |
| 2008/0029644 A1 * | 2/2008 | Martinez Cerezo et al. | 244/119 |
| 2008/0060755 A1 * | 3/2008 | Blanton et al. | 156/307.1 |
| 2008/0182054 A1 | 7/2008 | Ridges et al. | |
| 2009/0041972 A1 | 2/2009 | Rodman | |
| 2009/0123708 A1 * | 5/2009 | Depase et al. | 428/178 |
| 2010/0136293 A1 * | 6/2010 | Kubryk et al. | 428/156 |
| 2010/0316837 A1 * | 12/2010 | Packer et al. | 428/105 |
| 2011/0024032 A1 | 2/2011 | Barber et al. | |
| 2011/0086199 A1 * | 4/2011 | Duqueine et al. | 428/112 |
| 2011/0104432 A1 | 5/2011 | Duqueine et al. | |
| 2011/0259508 A1 * | 10/2011 | Inserra Imparato et al. | 156/182 |
| 2011/0308714 A1 * | 12/2011 | Sander et al. | 156/243 |
| 2013/0233470 A1 * | 9/2013 | De Mattia | 156/161 |
| 2013/0233474 A1 * | 9/2013 | De Mattia | 156/222 |
| 2013/0333830 A1 * | 12/2013 | Stewart | 156/182 |

FOREIGN PATENT DOCUMENTS

| | | |
|---|---|---|
| WO | 2008086022 | 7/2008 |
| WO | 2009020466 | 2/2009 |
| WO | 2009090397 | 7/2009 |

* cited by examiner

METHOD OF MANUFACTURING A PART MADE OF COMPOSITE MATERIAL AND TOOL FOR THE IMPLEMENTATION THEREOF

CROSS-REFERENCES TO RELATED APPLICATIONS

This application claims the benefit of the French patent application No. 12 52175 filed on Mar. 12, 2012, the entire disclosures of which are incorporated herein by way of reference.

BACKGROUND OF THE INVENTION

The present invention relates to a method of manufacturing a part made of composite material as well as a tool for the implementation thereof. The invention more particularly relates to a method of manufacturing an aircraft fuselage frame.

According to an embodiment shown in FIG. 1, a fuselage frame 10 is in the form of a profile having a Z-shaped cross-section whose central portion referred to as a core 12 forms a complete or partial ring. The profile comprises a first wing 14 referred to as an inner wing arranged in the area of the inner edge of the core 12 and perpendicular to the latter and a second wing 16 referred to as an outer wing arranged in the area of the outer edge of the core 12, also perpendicular to the latter.

A method of manufacturing such frame from composite material is described in document FR 2.928.295.

According to this document, first, a substantially rectangular strip is made from a stack of three pre-impregnated fiber plies, each ply having fibers oriented along a direction, the strip comprising plies with different orientations of fibers, a ply with fibers at 30°, a ply with fibers at 90°, and another ply with fibers at 150°.

Second, the strip of fiber plies is arranged on a mandrel made of deformable material then compressed on this mandrel so as to conform to the shape thereof.

The deformable mandrel is capable of becoming deformed between a rectilinear position and a curved position but has an incompressible or quasi-incompressible transverse section.

Then, the deformed strip arranged on the mandrel made of deformable material is placed in contact with a heated tool having, at its periphery, radial sections with a profile, complementary to the transverse sections of the mandrel. Thus, during bending, the strip is compressed and subjected to a rise in temperature.

Subsequent to the setting in place of this first strip, a second strip having three plies of pre-impregnated fibers is cut out to be arranged on another deformable mandrel and then compressed on the latter.

Then, this second strip, deformed on its mandrel made of deformable material, is placed in contact with the first strip still in place on the tool then compressed against the first strip.

To obtain a frame, it is necessary to attach, as mentioned previously, several strips on top of one another, before polymerizing the assembly thus formed.

More conventionally, according to a mode of operation, to make a part from composite material, first a preform 18 of pre-impregnated fibers is made by stacking layers 20 on top of one another on a laying surface 22 of a tool 24, as shown in FIG. 2, then this preform 18 is subjected to a polymerization phase.

The present invention relates more particularly to this polymerization phase during which the preform 18 is covered with a lining 26.

On a functional level, this lining 26 must:
provide a geometrical shape to one of the surfaces of the preform;
ensure the compression of the preform from an outer pressure;
allow gas included in the preform to be extracted; and
allow the preform to be heated while minimizing thermal gradients.

According to an embodiment, the tool 24 comprises a gas extraction apparatus which opens out, via at least one opening 28, in the area of the laying surface 22, outside the zone covered by the preform, yet at a reduced distance from said zone.

The lining 26 comprises:
a conforming plate 30 whose peripheral edges 32 are slightly set back relative to the peripheral edges (or flanks) 34 of the preform;
draining fabrics 36 provided at the periphery of the preform 18 and conforming plate 30 in contact with the laying surface 22 in the area of the openings 28 of the gas extraction apparatus;
an unmolding film 38 covering the conforming plate 30;
a drainage felt 40 which covers the conforming plate 30 and the draining fabrics 36; and
a bladder 42 which is connected to the laying surface 22 via sealing means 44 in the periphery of the draining fabrics 36.

After the lining has been set in place, the preform is subjected to a polymerization phase after which the fibers are embedded in a resin matrix, which is accompanied with a contraction of the preform causing a thickness reduction on the order to 5 to 12%.

The lining 26 of the prior art is not entirely satisfactory for the following reasons:

Setting in place different layers of lining is lengthy and tedious, even more so if the surface to be covered is non-developable.

Considering the complexity thereof, the setting in place of the lining can only be done manually and cannot be automated.

The different lining elements are costly at the time they are purchased as well as recycled at the end of their lifespans.

When the surface of the part in contact with the lining is non-developable, the risks of rupture of the bladder are not negligible during polymerization, which causes the part to be rejected.

Finally, this type of lining does not guarantee control over the geometry of the surface covered by the lining for the following reasons:

First, the outer pressure applied to one of the surfaces of the conforming plate is not strictly all around equal to the reaction force exerted by the preform on the opposite surface of the preform. Because the conforming plate is in contact only with the preform, it is not stabilized and can move slightly due to this difference of forces, which means that geometric tolerances (more particularly those pertaining to thicknesses) may not be respected.

Second, when the outer surface of the conforming plate is non-developable, the bladder exerts forces on the conforming plate which may be not strictly oriented according to the norm and cause the deformation or displacement of said conforming plate, which means that geometric tolerances (more particularly those pertaining to thicknesses) may not be respected.

SUMMARY OF THE INVENTION

Therefore, the present invention aims at overcoming the drawback of the prior art by providing a method of manufacturing a part from composite material allowing the manufacturing costs to be lowered while limiting the risks of not respecting dimensional tolerances.

To this end, the object of the invention is a method of manufacturing a composite material part from a preform of fibers pre-impregnated with resin, which is characterized in that it consists of:
- laying said preform on a laying surface of a tool with a peripheral shoulder delimiting a zone whose dimensions are greater than those of the preform so as to house said preform, said peripheral shoulder comprising a support surface spaced apart by a value H from the laying surface;
- covering said preform with a lining comprising a conforming plate delimited by a peripheral edge which extends beyond the peripheral flank of the preform over the entire periphery of the preform, said conforming plate and said peripheral shoulder having such dimensions that the lower surface of the peripheral edge of the conforming plate faces the support surface of the shoulder;
- using shims calibrated to position the conforming plate, said shims having a thickness substantially equal to the contraction value of the preform, said shims being arranged between the support surface and the peripheral edge;
- removing said calibrated shims;
- arranging sealing means connecting the conforming plate and the tool all around the preform;
- polymerizing said preform.

BRIEF DESCRIPTION OF THE DRAWINGS

Other characteristics and advantages will become apparent from the description of the invention that follows, a description given only by way of non-limiting example, with reference to the annexed drawings, wherein.

DETAILED DESCRIPTION OF THE PREFERRED EMBODIMENTS

Figure 1:
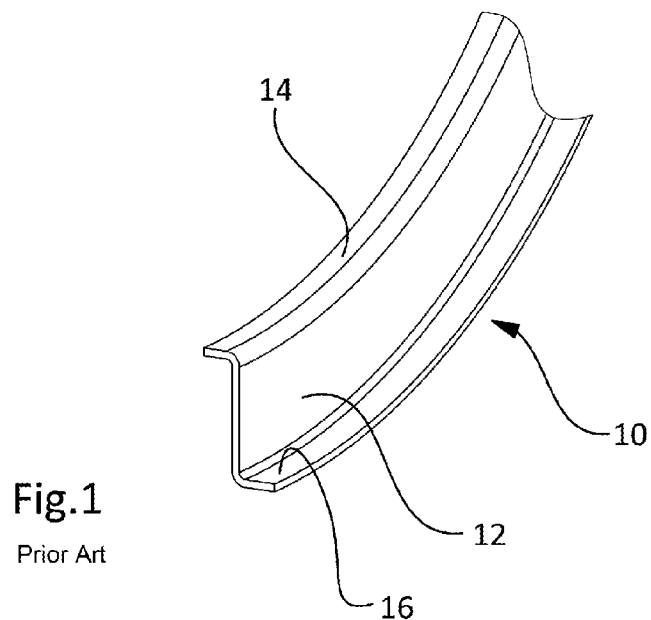
FIG. 1 is a perspective view of a portion of an aircraft fuselage frame.
Figure 2:
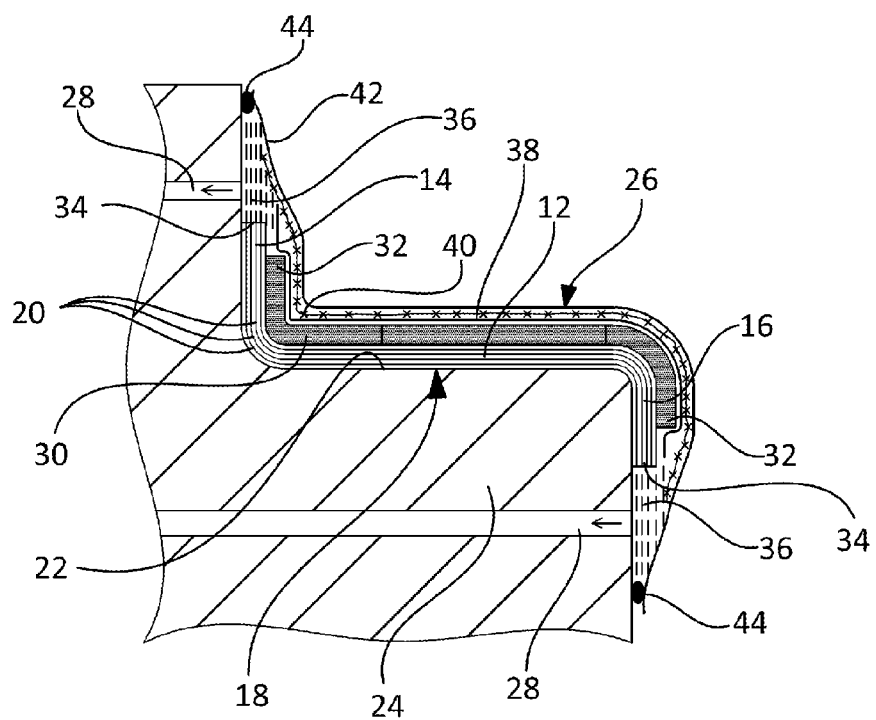
FIG. 2 is a cross-sectional view of a tool used during polymerization of a composite material part according to the prior art.

FIG. 1 shows a fuselage frame 10 in the form of a profile with a Z-shaped cross-section whose central portion referred to as a core 12 forms a complete or partial ring. The profile comprises a first wing 14 referred to as an inner wing arranged in the area of the inner edge of the core 12 and perpendicular to the latter and a second wing 16 referred to as an outer ring arranged in the area of the outer edge of the core 12, also perpendicular to the latter.

To give an order of magnitude, the core has an 80-mm height, a thickness on the order of 4 to 6 mm. The wings have a width on the order of 30 mm.

The invention is not limited to this cross-sectional shape and to this application. It can be used to make different shapes of parts.

Figure 3:
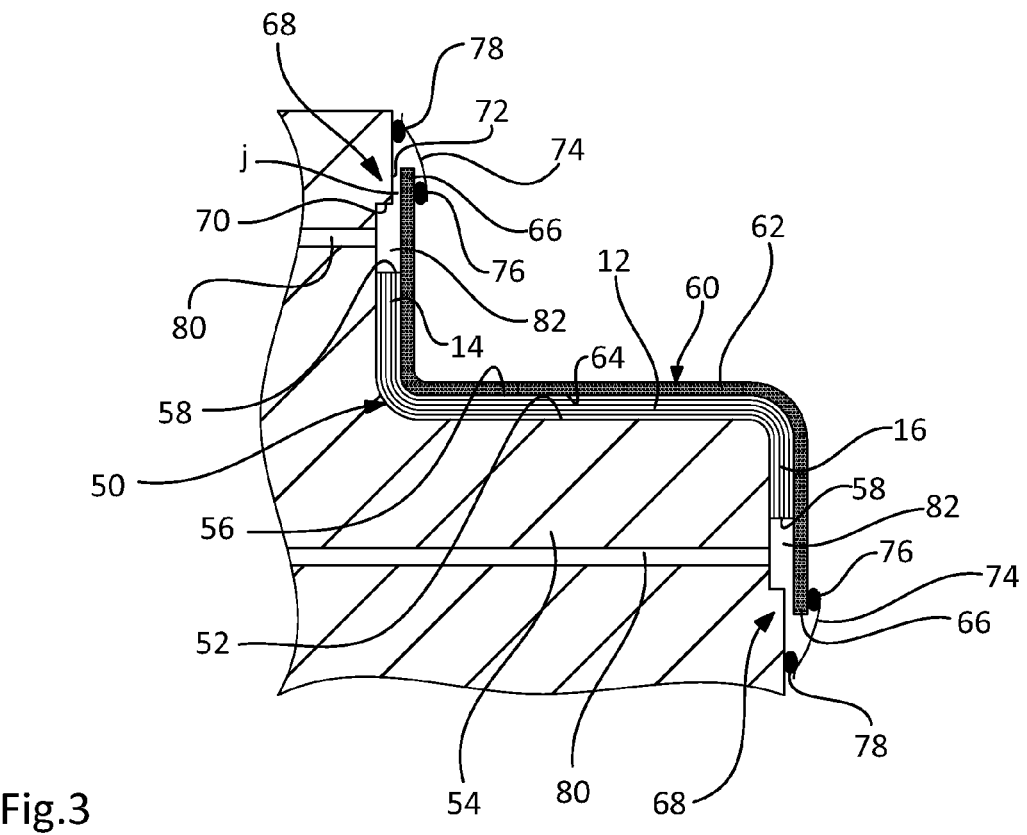
FIG. 3 is a cross-sectional view of a tool used during polymerization of a composite material part according to the invention.

Generally, as shown in FIG. 3, a composite material part is obtained from a preform 50 of fibers pre-impregnated with resin, said preform 50 being arranged on a laying surface 52 of a tool 54 and being delimited by a lower surface (in contact with the laying surface 52), an upper surface 56, and a peripheral flank 58.

The laying surface 52 must have a profile, complementary to that of a surface referred to as a first surface of the part to be made. In parallel, the upper surface 56 of the preform must have a determined profile so that, after polymerization, taking into account contraction phenomena, the upper surface 56 corresponds to the second surface of the part to be manufactured and respects dimensional tolerances with the first surface, particularly in term of thicknesses.

According to a method of manufacture, the preform 50 is obtained by stacking layers of fibers. However, the invention is not limited to this method of manufacturing the preform.

To carry out the polymerization phase, the preform 50 is covered with a lining 60.

The lining 60 comprises a conforming plate 62, a lower surface 64 of which has a profile complementary to that of the second surface of the part to be made. The conforming plate 62 is solid so as to be gas-tight in the manner of a bladder of the prior art.

The conforming plate 62 is delimited by a peripheral edge 66.

According to the invention, over the entire periphery of the preform 50, the peripheral edge 66 extends beyond the peripheral flank 58 of the preform.

Figure 4:
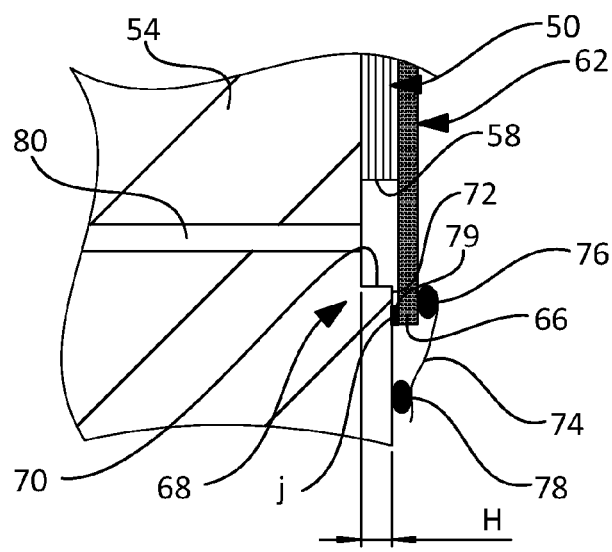
FIG. 4 is a cross-sectional view showing, in detail, a peripheral shoulder.

In parallel, the laying surface 52 comprises a peripheral shoulder 68 delimiting a zone whose dimensions are greater than the preform 50 so as to house said preform. The peripheral shoulder 68 (shown in detail in FIG. 4) comprises, on the one hand, a first surface 70, preferably perpendicular to the laying surface 52, spaced apart from the peripheral flank 58 over at least part of the periphery of the preform 50, and on the other hand, a second surface referred to as a support surface 72 spaced apart by a value H from the laying surface 52 and substantially parallel to the latter.

The conforming plate 62 and the peripheral shoulder 68 have dimensions that are adapted for the lower surface of the peripheral edge 66 of the conforming plate 62 to be facing the support surface 72 of the shoulder.

Advantageously, the height H of the peripheral shoulder 68 is less than and preferably equal to the height of the flank of the part to be made all around the periphery of the part to be made. Thus, before polymerization, there is a play j between the support surface 72 and the conforming plate 62 corresponding to the contraction value of the preform 50. By way of example, the play is equal to on the order of 5 to 12% of the height of the preform flank, namely, the contraction value. At the end of the polymerization, the peripheral edge 66 of the conforming plate 62 comes in contact with the support surface 72 of the shoulder, which allows for the flank height to be guaranteed.

Having this shoulder limits the movements of the conforming plate during polymerization, and more particularly at the end of the polymerization in order to guarantee the dimensional tolerances are respected.

The lining 60 further comprises sealing means connecting the conforming plate 62 and the tool 54, all around the preform 50.

According to an embodiment, these sealing means comprise a flexible strip 74 which extends over the entire periphery of the conforming plate 62, one of the lateral edges of said flexible strip 74 covering the peripheral edge 66 of the conforming plate 62, whereas the other lateral edge comes in contact with the tool 54 in the area of the support surface 72. A first peripheral sealing joint 76 is sandwiched between the flexible strip 74 and the upper surface of the peripheral edge 66 of the conforming plate 62, whereas a second peripheral sealing joint 78 is sandwiched between the flexible strip 74 and the support surface 72.

The tool 54 comprises calibrated shims 79 whose thickness is substantially equal to the contraction value of the preform. These calibrated shims 79 arranged between the support surface 72 and the peripheral edge 66 of the conforming plate allow the correct positioning thereof. These shims are removed before polymerization begins.

The tool 54 comprises a gas extraction apparatus which opens out, via at least one opening 80 in the area of the laying surface 52, between the surface 70 of the shoulder 68 and the peripheral flank 58 of the preform 50. Advantageously, the tool 54 comprises several openings 80 distributed over the periphery of the preform that open out in the area of a peripheral cavity 82 extending over the entire periphery of the preform, said cavity 82 being delimited by the laying surface 52, the flank 58 of the preform, the conforming plate 62, and the surface 70 of the shoulder 68. This arrangement facilitates the extraction of the gas included in the preform.

According to an embodiment, the tool can comprise means for injecting a gas in the preform at the end of the polymerization, as indicated in patent application FR-2.959.158. Advantageously, the openings 80 can be used to inject a gas.

According to the invention, the setting in place of the lining is made easier due to the limited number of elements to be positioned, namely, the conforming plate 62, then the flexible strip 74 and its joints 76 and 78.

Considering the limited number of elements and the rigidity of the conforming plate, the setting in place of the lining can be, at least in part, automated.

These elements can be used several times and their purchase and recycling costs are drastically less than those of the elements of the prior art.

According to another advantage, because the conforming plate takes support against the shoulder at the end of the polymerization, it is perfectly immobilized and positioned and dimensional tolerances are thus respected.

According to another advantage, the calibrated shims facilitate the positioning of the conforming plate.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of manufacturing a composite material part from a preform of fibers pre-impregnated with resin, delimited by a lower surface, an upper surface, and a peripheral flank, said method comprising:
    laying said preform on a laying surface of a tool with a peripheral shoulder delimiting a zone whose dimensions are greater than those of the preform so as to house said preform, said peripheral shoulder comprising a support surface spaced apart by a value H from the laying surface;
    covering said preform with a lining comprising a conforming plate delimited by a peripheral edge which extends beyond the peripheral flank of the preform over an entire periphery of the preform, said conforming plate and said peripheral shoulder having such dimensions that a lower surface of the peripheral edge of the conforming plate faces the support surface of the shoulder;
    using shims calibrated to position the conforming plate, said shims having a thickness substantially equal to a contraction value of the preform, said shims being arranged between the support surface of the peripheral shoulder and the peripheral edge of the conforming plate;
    removing said calibrated shims;
    arranging sealing means connecting the conforming plate and the tool all around the preform; and
    polymerizing said preform.

2. The method according to claim 1, including using a tool with a peripheral shoulder whose height is equal to a flank height of the part to be made.

3. The method according to claim 1, including extracting gas in a peripheral cavity which extends over the entire periphery of the preform, said cavity being delimited by the laying surface, the flank of the preform, the conforming plate and the shoulder.

* * * * *